United States Patent [19]

Ludwig

[11] Patent Number: 4,834,962
[45] Date of Patent: May 30, 1989

[54] PROCESS AND APPARATUS FOR THE CATALYTIC REACTION OF GASES

[75] Inventor: Gerhard Ludwig, Haltern, Fed. Rep. of Germany

[73] Assignee: Huels Aktiengesellschaft, Marl, Fed. Rep. of Germany

[21] Appl. No.: 171,240

[22] Filed: Mar. 16, 1988

Related U.S. Application Data

[63] Continuation of Ser. No. 838,722, Mar. 11, 1986, abandoned.

[30] Foreign Application Priority Data

Mar. 11, 1985 [DE] Fed. Rep. of Germany ....... 3508553

[51] Int. Cl.$^4$ ............................................. B01D 5/00
[52] U.S. Cl. ................................... 423/351; 422/171;
422/175; 422/176; 423/210; 423/239;
423/245.1; 423/403; 423/659; 423/DIG. 13
[58] Field of Search ............... 423/239, 245, 403, 351,
423/659, 210, DIG. 13

[56] References Cited

U.S. PATENT DOCUMENTS

| | | | |
|---|---|---|---|
| 3,189,417 | 6/1965 | Houdry et al. | 422/175 |
| 3,407,045 | 10/1968 | Temple | 422/178 |
| 3,897,439 | 7/1975 | Fleming. | |
| 3,957,444 | 5/1976 | Goto et al. | 422/115 |
| 3,997,294 | 12/1976 | Kritzler | 422/175 |
| 4,215,099 | 7/1980 | Pinto et al. | 423/361 |
| 4,391,880 | 7/1983 | Tsao | 423/DIG. 13 |
| 4,418,046 | 11/1983 | Izumo | 422/178 |

FOREIGN PATENT DOCUMENTS

| | | |
|---|---|---|
| 0037119 | 3/1981 | European Pat. Off. . |
| 2350086 | 9/1975 | Fed. Rep. of Germany . |
| 52-21277 | 2/1977 | Japan ................................... 422/178 |

OTHER PUBLICATIONS

John H. Perry, *Chemical Engineers' Handbook*, Fourth Edition (1963), McGraw-Hill Book Company, pp. 9-58, 9-59, and 9-60.

*Primary Examiner*—John Doll
*Assistant Examiner*—Wayne A. Langel
*Attorney, Agent, or Firm*—Millen & White

[57] ABSTRACT

A process for the catalytic gaseous phase reaction of a reactive gas wherein the heat of reaction generated produces a temperature elevation of less than about 150° C. in the substantially adiabatic reaction system, the improvement comprising:

heating the cold reactive gas by passing it through a heated regenerative material present in the first portion of a vessel;

passing the heated reactive gas through a solid catalyst for the reaction present in a second portion of the vessel to form a gaseous product stream;

redirecting the gaseous product stream;

passing the redirected gaseous product stream through the solid catalyst for the reaction present in the second portion of the vessel to form additional gaseous product, cooling the gaseous product stream by passing it through a cooled regenerative material present in the first portion of the vessel; and periodically reversing the flow direction in the portions of the reaction system.

23 Claims, 1 Drawing Sheet

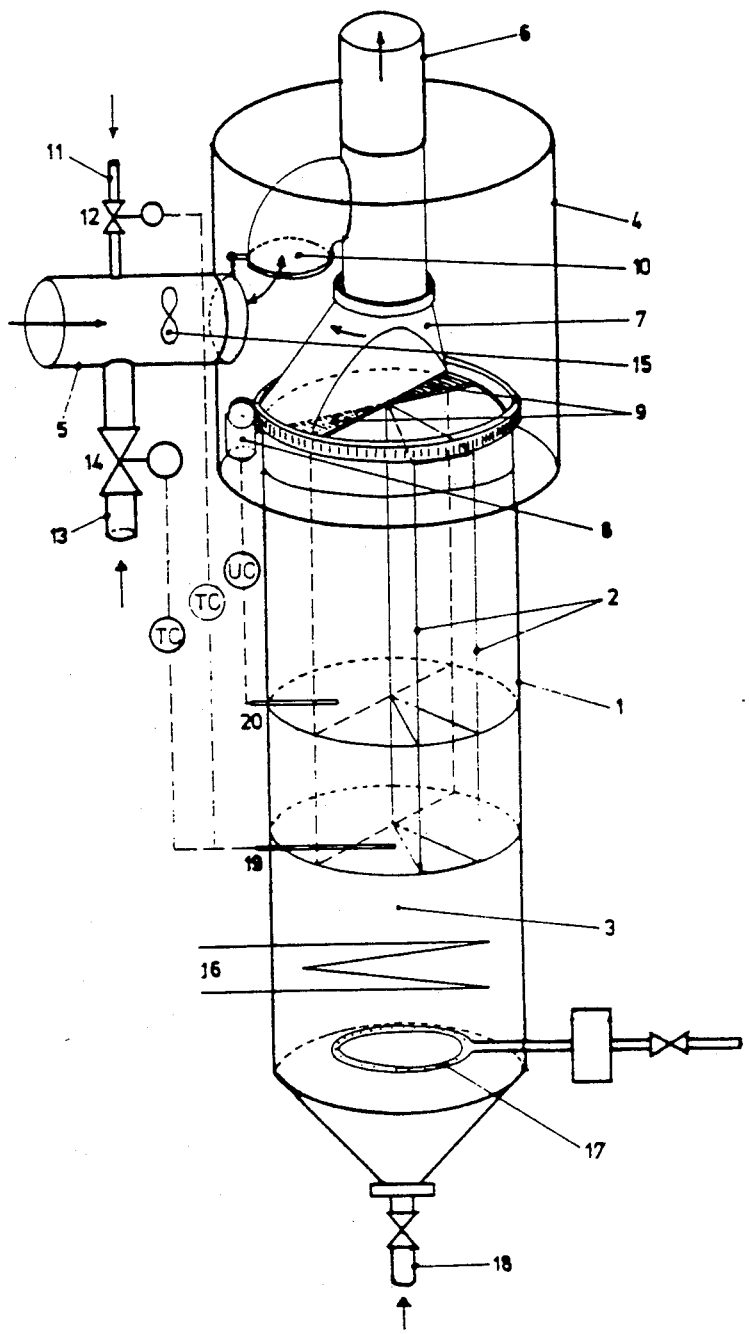

PROCESS AND APPARATUS FOR THE CATALYTIC REACTION OF GASES

This application is a continuation of application Ser. No. 838,722 filed Mar. 11, 1986, abandoned.

BACKGROUND OF THE INVENTION

The invention relates to a process and accompanying apparatus for the catalytic reaction of reactive gases, and more particularly relates to a process and apparatus for the catalytic reaction of gaseous mixtures which exhibit only a relatively small exothermic heat evolution.

DESCRIPTION OF THE PRIOR ART

Gaseous streams capable of undergoing a catalytic reaction must usually be preheated even when exothermic reactions are involved, to a specific activation temperature at which the catalytic reaction begins. For this purpose, after the reaction has commenced, the heat of reaction downstream from the catalytic reaction can be recycled to the feed gas to be reacted, utilizing heat exchangers. However, if the reactions produce only a relatively small increase, e.g., about 5° to 150° C., in system temperature change, the amount of heat returnable by conventional methods and apparatus generally is inadequate for attaining the necessary activation temperature in the feed gas. Consequently, considerable amounts of energy must be supplied from outside the system. If such amounts are to be reduced, a disproportionately high expenditure must be incurred for the heat exchange between the gas discharged from the reactor and the feed gas. The smaller the adiabatic temperature rise of an exothermic reaction, the higher the conventionally required expenditures.

Many different apparatus and methods for conducting exothermic catalytic gas reactions are both known and widely utilized in industrial processes. The catalyzed pyrolysis of deleterious or undesirable substances in a number of exhaust gas streams has been the subject of a particularly extensive research effort, particularly regarding the reaction of low impurity concentrations in large gaseous streams.

The behavior of combustion reactions in catalyst packings and in honeycomb-shaped catalyst components has been examined in the papers of E. Wicke, *Chemie-Ing.-Techn.* 37:892 et seq. (1965); G. Padberg and E. Wicke, *Chemical Eng. Science* 22:1035 et seq. (1967); and H. Koch and K. Kirchner, *Dechema-Monograph* 75:145 et seq. It was discovered that the reaction diminishes when the inlet temperatures drop below a certain value and/or the reaction zone migrates along the direction of the gas flow when certain flow velocities are exceeded, the zone eventually exiting from the catalyst layer. Conversion, in either case, drops to unacceptably low levels, and sometimes even to zero.

For this reason, maximally active catalysts possessing a low activation temperature have been sought by the art, and a number of devices have been proposed which require the permanent usage of additional fuel and/or huge installations for heat exchange. Examples are found in *Dechema Monograph* 52:197-199; *Dechema Monograph* 75:176; *Dechema Monograph* 86/1:150, 151; *Dechema Monograph* 86/2: 474-478; and *Chemie-Ing.-Techn.* 37:905-912(1965).

All of these installations h ve the common feature that the feed gas stream is hea ed to the necessary activation temperature prior to entering the catalyst material, through the combustion of additional amounts of fuel, and that the feed gas stream flows continuously in one direction through the catalyst material present in the reactor throughout its entire cross section.

It has also been proposed to utilize the phenomenon of reaction zone migration for the substantially complete reaction of reactive gaseous streams having small adiabatic exotherms with inexpensive utilization of heat exchange apparatus by a periodic reversal of the flow direction of the gases: G. K. Boreskov and Yu. Sh. Matros, *Catal. Rev.-Sci. Eng.* 24/4: 551-590 (1983)

Solving the problem of flow reversal regarding suitable apparatus is accomplished by a synchronous switchover of at least two valves. However, it is very difficult to attain, with the large gaseous streams being processed, such valve switchovers without creating undesirable disturbances in the pressure or flow relationships present in the system.

OBJECTS OF THE INVENTION

An object of this invention is to provide a method of developing a suitable process for catalytic reactions which release relatively small amounts of heat (having small adiabatic $\Delta$ t's) and to provide an apparatus for economically and effectively performing such processes.

Another object is to provide a process of economically conducting such reactions, and of developing simple, yet effective apparatus in which to undertake the process.

Upon further study of the specification and appended claims, further objects and advantages of this invention will become apparent to those skilled in the art.

SUMMARY OF THE INVENTION

These and other objects have been attained, in a process aspect, by a process for the catalytic gaseous phase reaction of reactive gases wherein the heat of reaction generated produces a temperature elevation of less than about 150° C. in the substantially adiabatic reaction system, the improvement comprising:

heating the cold reactive gas by passing it through a heated regenerative material present in a first portion of a first stage;

passing the heated reactive gas through a solid catalyst for the reaction present in a second portion of said stage to form a gaseous product stream;

redirecting the gaseous product stream;

passing the redirected gaseous product stream through a solid catalyst for the reaction present in a second portion of a second stage to form additional gaseous product in said product stream;

cooling the latter gaseous product stream by passing it through a cooled regenerative material present in a first portion of said second stage; and periodically reversing the flow direction in said portions and stages of the reaction system.

In an apparatus aspect, the invention has been attained through the development of an apparatus for the catalytic reaction of reactive gases wherein the heat of reaction is moderately high and wherein, in the gaseous phase, a temperature elevation is produced of less than 150° C., the apparatus comprising:

a vessel having a first and a second lengthwise portion, the vessel having a circular end face at one end, said vessel containing in the first portion a regenerative material extending over the entire cross section thereof, a catalyst material contained in the second portion and likewise extending over the entire cross section;

ducts or tubular paths extending from one end to the other end of the regenerative material and catalyst material;

cover means positioned at the circular end face of the filling chamber, said cover means including means for inflowing reactive gas into some but not all of the ducts, and means for discharging from the vessel gas flowing out of the remaining ducts, said cover means being sealed with respect to both said discharged gas means and said circular end face of the filling chamber and said cover means also being rotatable with respect to said circular end face; and a rerouting chamber positioned within the vessel at the end of the filling chamber opposite the circular end face and adjacent to the end of the catalyst material, whereby said reactive gas flowing out of said inflow ducts is redirected back into said remaining outflow ducts.

BRIEF DESCRIPTION OF THE DRAWINGS

Various other objects, features and attendant advantages of the present invention will be more fully appreciated as the same becomes better understood when considered in connection with the accompanying drawing which represents an outline of a preferred embodiment of the apparatus of this invention.

DETAILED DISCUSSION

In the process of the invention, the reactive gas flowing through the warmed portion of a heat exchanger is heated, by thermally contacting the heat exchange material, to at least the desired activation temperature of the particular catalytic reaction involved before it enters the catalyst material in the reactor section adjoining the heat exchange, i.e., regenerative material. In the catalyst-containing section, part of the catalyzed reaction of the reactive gas commences, causing the gas to further heat up. The gas exiting from the catalyst material is then conducted through at least one additional zone containing catalyst material; during this step, the reactive gas is substantially entirely reacted and reaches a relatively high temperature peak, e.g., about 300° to 600° C. The hot gas transfers an amount of its heat content to the colder heat exchange material, through which it is subsequently thermally recontacted before leaving the reactor vessel.

In one preferred embodiment the gas flows essentially parallel to the axis of the reaction vessel containing both heat exchange and catalyst materials. The inflowing gas passes through a partial cross section of heat exchange material and catalyst material; the resultant effluent gas—after being redirected in the apparatus—flows through the remainder of the partial cross section containing both catalyst and heat exchange materials. On account of a uniform rotation about the axis of the filling chamber, the section of the filling chamber entered by the inflowing gas periodically passes into the section utilized by the effluent gas.

In the steady-state mode of operation under adiabatic conditions, i.e., with a sufficiently good insulation of the entire apparatus, the amount of heat carried along with the effluent gas is equal to the amount of heat exothermically produced by the reaction, independent of the ambient temperature of the catalyst reactor.

If the amount of heat which is exchanged between the feed and effluent gases is insufficient for maintaining the necessary activation temperature, additional gaseous reactive material, e.g., fuel, can be introduced, for example, into the reacting gaseous mixture before it enters the heat exchanger. If, however, the amount of heat exchanged is, instead, excessive, then the temperature in the catalyst can be reduced, e.g., by introduction of an inert cooling gas, e.g., air, nitrogen, cooled recycle gas, into the reactive gaseous mixture. The precise amount of additionally introduced reactive or cooling gas is dependent on the lowest and highest temperature, respectively, of the gas in the rerouting chamber. Both gas quantities can be effectively regulated, preferably by controlling the average temperature in the rerouting chamber.

The temperature of the reactive gas prior to entering the reactor section containing the catalyst is dependent on the rotational speed at which the portions of the heat exchange material and of the catalyst reached by the feed and effluent gases pass alternatingly over into each other. The rotational speed can, for example, be regulated along with this temperature. If the adiabatic exotherm is small, e.g., 30 degrees C., the rotational speed is relatively large, e.g., 10 to 20 revolutions per hour. If the adiabatic exotherm is relatively large, e.g., 80 degrees C., the rotational speed is relatively small, e.g., 2 to 5 revolutions per hour.

The rotational speed is determined by the maximum temperature which has to be reached in the zone of the catalytic reaction in order to achieve the desired conversion rate. The higher the rotational speed at a given concentration of reactants, the higher the peak temperature in the catalyst material.

The process of this invention is applicable, for example, to those reactive gases containing air-oxidizable compounds, and to nitrogen oxides that can be reduced with ammonia.

Conventional catalysts are well known. Such materials include, for example, platinum, rhodium, palladium, iron, copper, chromium, molybdenum, nickel. The active components are normally precipitated on suitable carrier materials which include alumina, silica, barium sulfate, calcium carbonate, in the form of, e.g., extrudates, tablets, rings, spheres, honeycombs and others.

Materials that are known to be effective heat exchange materials, e.g., solids, can be utilized in the invention. Suitable materials include, for example, ceramics of silica and/or alumina in the form of irregular pieces, balls, rings and others or sheet-metal packs as being used in regenerative heat exchangers in power stations. Also the catalyst material itself can be used as heat exchange material.

The apparatus of this invention consists of a vessel, the filling chamber of which has a substantially circular cross section at least at one end thereof. The feed gas, which generally is relatively cool, e.g., about 20° C. to 100° C., enters through a portion of this circular cross section. The feed gas initially flows, in longitudinally preferably by walls of metal sheet and whose entrance cross section is a sector of a circle or part of it. A heat insulation between the chambers is not necessary. The number of chambers is at least six, preferably 12 to 24.

The ducts are especially designed as honeycombs, which are characterized by a great number of longitudinal holes which are essentially extending through the entire length of the filling material. In this case, no additional separating walls are necessary.

The heat transferring material has a temperature gradient, the highest temperature adjacent to the catalyst material. The temperature at the "cold" end ranges from about 20° C. to 200° C., preferably from 40° C. to 150° C. The temperature at the "hot" end ranges from 250° C. 5o 600° C., preferably from 300° C. to 500° C.

The inlet gas is heated up, then enters into the catalyst-containing section at a temperature of about 200° C. to 400° C., preferably 250° C. to 350° C., and is at least partially reacted, is rerouted downstream from the catalyst-containing section, then passes along the other part of the cross section not traversed heretofore, first entering into the catalyst-containing section and thereafter through the regenerative material, and is thereupon discharged from the vessel.

The average temperature at the "cold" end of the catalyst material and in the heat exchange section behind the rerouting chamber are higher than the average temperature in the inlet section by the adiabatic exotherm minus any heat loss to the environment of the apparatus and minus any deliberate heat removal from the gas within the rerouting chamber.

The vessel filled with regenerative material and catalyst material shall be referred to as reactor in the description set forth below.

Separation of the reactor into two or more zones is effected by a special cover hood which separates the feed gas stream from the exhaust gas stream utilizing a tight sealing action. The rotational velocity of the cover hood is a means for controlling the peak temperature and thus for the conversion rate in the catalyst section. It may vary according to changes in the concentration of reactants or due to a change in catalyst activity. The cover hood and the filling chamber are positioned so that they can be rotated with respect to each other. In general, it is desirable to rotate the cover hood with respect to the fixed filling chamber.

This arrangement has the result that a relatively cold gaseous stream is first heated up to a particular activation temperature, undergoes an exothermic reaction in the catalyst-containing reactor section, and after it leaves the catalyst material, transfers the largest portion of its acquired heat back to the cooler regenerative material.

The rotational motion of the cover hood enables a periodic reversal of the flow direction in the ducts and chambers, respectively. By judiciously controlling the velocity of the rotational movement, the mass ratio of the reactive gas stream to heat exchange material plus catalyst material, which is in the range of 0.5 to 20 kg/kg·h, preferably 1 to 10 kg/kg·h, the concentration of reactive compounds present in the gaseous stream, which ranges from 0.001 to 10% by volume, preferably from 0.1 to 1% by volume, and the inlet temperature of the gas, the result can be achieved whereby a selected amount of the catalyst material required for the desired degree of conversion constantly exhibits the necessary temperature. The mass ratio of feed gas to catalyst material being 0.5 to 40 kg/kg·h, preferably 2 to 20 kg/kg·h.

In some embodiments, the presence of heat transfer material can be omitted, with the catalyst material also performing the heat exchange function. Such embodiments are used for reactions with adiabatic exotherms in the upper range, e.g., from 60 degrees to 150 degrees C., preferably from 100 degrees to 150 degrees C.

In situations wherein the heat evolution is inadequate for maintaining effective catalytic conversion rates, the apparatus may contain an additional gas inlet that can be regulated by a valve, permitting the addition of easily reactive additive materials, i.e., fuels, in case of combustion processes. In instances where the heat evolution is too large, it is possible either to introduce a cooling gas, controlled by a regulating valve, into the reactive gaseous mixture at a point upstream of the reactor, or to remove a portion of the heat by means of a heat exchanger installed in the rerouting chamber. These auxiliary devices, as well as the aforementioned rotational movement, can be effectively controlled by one, or several, temperature sensors, e.g., thermocouples, positioned at the inlet or outlet of the catalyst-containing section and/or in the rerouting chamber.

In an embodiment where gases are fed into the reactive gaseous mixture, a mixing unit adaptable for homogenizing the gaseous stream prior to entering the reactor can be effectively incorporated.

Since the catalytic reaction can start only after initially heating the catalyst material to at least the activation temperature, a burner for combustion liquid and/or gaseous fuels is provided for start-up and the like, in the rerouting chamber. The air for the combustion process is supplied either by the burner itself, or by opening a valve or slide in the rerouting chamber.

The catalyst material can be uniformly heated while the gas inlet is closed, either by operating the rotary device or, in a substantially faster manner, by opening a bypass between the inlet and discharge sections of the reactor, as can be seen in the accompanying figure.

A variety of known, active materials are suitable for use as the catalyst material. Due to the typical requirement for a relatively low differential pressure, the catalyst material may consist of coarse-grained extruded products, tablets, irregular grains, rings, or spheres having an average particle size ranging from about 2 to 10 mm, and preferably 4 to 8 mm. In embodiments where only a minimum differential pressure, e.g., less than 0.2 bar, is required between the inlet and outlet of the reactor, tubular honeycomb members, produced from an active material, or coated or impregnated with active material, can be utilized.

The regenerative material can exhibit similar geometric shapes as those utilized by the catalyst material. When, for example, catalyst materials take the form of honeycomb members, sheet-metal packs developed for regenerative heat exchange are suitably employed. When using the apparatus for reactions having a very small temperature change, a good heat insulation, e.g., porous ceramics or rock wool is suitably installed.

The apparatus of this invention is preferably utilized for conducting gaseous-phase reactions having an exothermic temperature change ($\Delta t$) of less than about 150 degrees C., preferably 5 degress to 100 degrees C.

By utilizing the process and accompanying apparatus of this invention, it is possible, for example, to perform not only oxidation reactions, but also reductions, hydrogenations, halogenations, aminations and similar catalytic reactions. It is especially adaptable to react the nitrogen oxides present in the flue gases of power plants, which can take place especially in the cold section after removal of sulfur dioxide.

Another particularly suitable field of usage is the catalytic afterburning of the poisonous and/or noxious waste gases which must be kept out of the atmosphere to a maximum extent possible under current environmental protection regulations, e.g., waste gases from chemical processes, coating processes, printing plants, tire production, the grocery industry, leather tanning, textile cleaning, biological wastewater treatment, animal farming, garbage processing, animal carcass utilization and the like.

The apparatus of this invention is particularly effective as regards the following points:

1. a relatively simple improved design for a reactor which is generally employed in slightly exothermic catalytic gas reactions;
2. a single regenerative heat exchanger having sufficiently small dimensions so as to be arranged in one housing with the catalyst materials;
3. an apparatus having no valves positioned along the main gas stream, thereby permitting a reversal of flow direction without any interruption of the gas throughflow; this is accomplished solely by rotation of the cover hood with respect to the filling chamber.

As a result of employing the process and accompanying apparatus of the invention, the reactions can optimize the utilization of the reaction heat and can proceed at adequately high temperature levels, e.g., 300° to 600° C., while requiring only a minimum of catalyst material.

Further, it is possible to use even less active but more economical catalyst components; a minimum of external energy needs to be supplied, when utilizing a reaction system having a very low heat of reaction, when utilizing a system having a higher heat of reaction, a maximum of thermal energy can be obtained, and deposits on the catalyst are more easily avoided in many cases, especially during combustion processes.

The attached figure shows a special embodiment of the apparatus. The vertically arranged vessel is divided by means of several plates 2—of which only two plates are illustrated—into several cylindrical sections. These plates extend from the axis to the circumference of the vessel; and approximately from the top end face into the lower portion of the vessel, but do not extend to the bottom of the vessel. At the lower end of the plates, a rugged wire mesh—not shown—is horizontally arranged, with the rerouting chamber 3 being located underneath this wire mesh.

The volume between the wire mesh and the top end face of the vessel is the filling chamber, filled in the lower portion with catalyst material, and in the upper portion with regenerative, i.e., heat exchange material.

Cylinder 4 projects past the top end face of the vessel 1, with the feed gas conduit 5 terminating in this cylinder, while exhaust gas conduit 6 extends out of this cylinder; the exhaust conduit is positioned on the axis of vessel 1. The cover hood 7 with its drive mechanism 8 is positioned in the space between the exhaust gas conduit 6 and the top end face of the vessel 1. This hood is rotatable in relation to both exhaust gas conduit 6 and vessel 1. The hood is sealed in relation to the exhaust gas pipe and in relation to the vessel, connecting approximately half of the vessel 1 with the exhaust gas conduit while the remaining half of the vessel is open with respect to the feed gas conduit 5. Beneath the diametrical edge of the cover hood, two cover plates 9, each having the shape of a circular sector, are mounted; these plates cover two mutually opposed circular sectors. In this way, the feed gas chamber and the exhaust gas chamber are sealed against each other when the hood is in rotation.

Within the cylinder 4, valve flap 10 is located and, in the illustrated position, vacates the end of the feed gas conduit 5 and seals the end of the bypass between the feed gas chamber and the exhaust gas conduit 6. In its other position, flap 10 seals the end of the feed gas conduit and establishes a bypass between the feed gas chamber and the exhaust gas conduit.

Conduit 11, together with regulating valve 12, which is utilized for the introduction of reactive additive material, is mounted and enters feed gas conduit 5, together with the conduit 13 with regulating valve 14 for the introduction of cooling gas. A mixing device 15 is positioned between these merging streams and the end of the feed gas conduit.

Heat exchanger 16 utilizing an effective fluid coolant as well as a heating burner 17 are installed in the rerouting chamber 3. Furthermore, conduit 18, which can be opened and closed by a valve, enables air to enter into the rerouting chamber.

Temperature sensor 19 (e.g. thermocouple) is mounted in the rerouting chamber, this temperature sensor being connected so as to regulate valves 12 and 14. The sensor measures the average temperature in the rerouting chamber 3. Temperature sensor 20 regulates the hood drive mechanism 8, and is mounted in a cylinder cutout in the proximity of the transition point between catalyst material and regenerative material.

In order to render the apparatus operational, the feed gas conduit is initially closed by valve flap 10 and the feed gas chamber is connected by bypass to the exhaust material are heated by the ignited heating burner 17. The combustion air required for this purpose enters the rerouting chamber via the opened conduit 18. The heating process is finished as soon as the temperature sensor 20 has reached the specified temperature, e.g., about 200° to 400° C. Then the burner is shut off, the conduit 18 is blocked, and the valve flap 10 is switched over whereby the bypass between feed gas chamber and exhaust gas conduit is eliminated and the feed gas conduit is opened into the feed gas chamber. Valve flap 10, heating burner 17, and conduit 18 are not required for the steady-state operation of the apparatus.

The drive mechanism for the cover hood is turned on at this point, and the feed gas mixture is introduced into the vessel; catalytic reaction then begins.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

Reactor with Cylindrical Cross Section and Bulk Packing

A vertically set up reactor such as disclosed in the attached figure has a total charging volume of 1.5 m$^3$. The filling chamber, with a diameter of 1.25 m and a height of 1.3 m is divided by welded-in-place sheet-metal walls into 12 cylindrical sections of equal size. A wire screen is arranged at the lower end of the filling chamber and rests on a metal grating. The filling chamber is packed with catalyst material in the lower half. The catalyst material consists of cylindrical grains having a diameter of 6 mm and a length of 8–12 mm and contains 12% CuO and 1% $Cr_2O_3$ on aluminum oxide as the support material. The remainder of the filling space contains gravel of a grain size of 10–20 mm.

EXAMPLE 2

Reactor with Square Cross Section and Packaged Filling

The reactor has a square cross section with a lateral length of about 1.00 m and a filling chamber height of 12.50 m. The reactor is subdivided along its entire length into ten chambers having a cross-sectional size of 0.50 m×0.20 m. In the upper portion, the vessel tapers to a cylinder. The remaining structure of the reactor corresponds to the apparatus shown in the figure.

The cylindrical upper reactor portion is divided by axial partitions into ten sectors, each of which is connected with one of the aforedescribed chambers. In the lower portion, the chambers are filled up to a height of 2.50 m with a ceramic honeycomb catalyst material resting on a screen grating. The rerouting chamber, free of packing material, contains a burner and a sealable air feed means. The honeycomb-shaped catalyst material consists essentially of $V_2O_5$, $WO_3$, $TiO_2$, a clay-containing binder, and $CuO$.

Temperature sensors extending up to the center of the chamber cross section are installed in all chambers above the catalyst.

Above the catalyst, sheet-metal packs having a sheet thickness of 0.5 mm are installed to a height of 10 m, as they are utilized in regenerative heat exchangers for air preheating, for example in the flue gas duct of power plants (so-called "LUVOS"). Their heat exchange area is 210 $m^2/m^3$.

EXAMPLE 3

Catalytic Reaction of Benzene and Ethylbenzene in Exhaust Air

A reactor according to Example 1 is headed up by the process described in connection with the figure until the temperature sensor 20 indicates a temperature of 350° C. The preheated-reactor processes—after switchover—1400 $m^3$/hr of exhaust air from a chemical plant. The gas temperature prior to entrance into the reactor is 25° C. The gas contains 500 vppm of benzene and 100 vppm of ethylbenzene.

The cover hood is first rotated at about 4 revolutions per hour. After 15–20 revolutions, a quasi steady state condition is obtained characterized by a temperature, fluctuating in the rhythm of the revolutions, of 300°–370° C. at temperature sensor 20 and a temperature of about 530° C. at temperatures sensor 19.

The number of revolutions of the cover hood is gradually reduced to 2.3 per hour. The temperature at the sensor 20 at this point fluctuates between 250° and 400° C., and 480° C. is indicated at sensor 19.

The gas leaving the reactor contains less than 5 ppm of benzene and ethylbenzene.

EXAMPLE 4

Catalytic Reaction of Nitrogen Oxides in Exhaust Gas

A reactor according to Example 2 is utilized for the denitrosation of exhaust gas.

The catalyst is preheated by means of the gas burner in the rerouting chamber to a temperature of 350°–400° C. at temperature sensor 20. Exhaust gas from a coal-burning power plant downstream of a desulfuration plant, having a temperature of 60° C. and a content of 1200 mg of $NO_x/m^3_n$ (calculated as $NO_2$) is mixed in a quantity of 10,000 $m^3_n$ per hour with the stoichiometric amount of ammonia and conducted through the preheated reactor. The cover hood is brought to a number of revolutions of 60 per hour.

By means of the set of temperature sensors upstream of the catalyst material, the feeding of natural gas into the feed gas conduit is controlled so that none of the temperature sensors indicates less than 300° C. Feeding of natural gas is throttled when the temperature in the rerouting chamber exceeds 400° C. In this connection, this maximum limit temperature in the rerouting chamber has the primary regulating function.

After 5 hours, a quasi-stationary condition has been attained. The temperature at the ten temperature sensors 20 fluctuates between 300° and 330° C., and 390°–395° C. is measured at temperature sensor 19 in the rerouting chamber. Feeding of natural gas into the reactive gas stream prior to entrance into the reactor adjusts itself to less than 0.1 vol-%, based on the total stream.

More than 90% of the $NO_x$ is converted into nitrogen and water.

EXAMPLE 5

Deodorization of Exhaust Air from a Pigpen

The same reactor as described in Example 1 is utilized for deodorizing the malodorous exhaust air from a pen wherein 200 pigs are fattened. The reactor is heated in accordance with the process described in connection with the figure until the temperature sensor 20 indicates about 400° C. Upstream of the intake fan, 0.05 vol-% of propane is admixed to the gaseous stream of hourly 1100 $m^3$ of exhaust air.

In the equilibrium condition, at 4.5 revolutions per hour, the temperature at sensor 20 fluctuates between 210° and 420° C. while the temperature sensor 19 indicates about 470° C. The thus-purified exhaust air is almost odorless.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the catalytic gaseous phase reaction of a reactive gas wherein the heat of reaction generated produces a temperature elevation of less than about 150° in a substantially adiabatic reaction system, the improvement comprising:

providing a cold reactive gas having a temperature of about 20° to 100° C.;

heating the cold reactive gas by passing said gas in a first direction through a heated regenerative material present in a first part of a first stage;

passing the heated reactive gas concurrently to said first direction through a solid catalyst for the reaction present in a second part of said stage to form a gaseous product stream;

passing the partially reacted gaseous product stream in a second direction concurrently to said first direction through a solid catalyst for the reaction present in a second part of a second stage to form additional gaseous product in said product stream;

cooling the latter gaseous product stream by passing said stream concurrently to said second direction through a regenerative material present in a first part of said second stage, said regenerative material being cooler than said product stream; and periodically reversing the flow direction in said parts and stages, said stages being housed in rotatable zones, and rotating said stages.

2. A process of claim 1, wherein the product stream is passed through a plurality of stages equivalent to said first stage and a plurality of stages equivalent to said second stage, the flow directions in all stages being periodically and cyclically reversed.

3. A process according to claim 2, wherein the stages are conducted in an apparatus suitable for undertaking both heat exchange and catalytic reaction therein, comprising parallel and separate ducts for providing said stages, a redirecting chamber being formed at the bottom of said ducts for reversing the flow direction out of the ducts forming the first stages so that it flows in the opposite direction with the ducts forming the second stages.

4. A process according to claim 2, wherein the process further comprises adjusting the temperature of the cold reactive gas by either adding a gaseous reactive additive, or adding a cooling gas into the reactive gas before it enters the first stages.

5. A process as claimed in claim 2, wherein the cold reactive gas is heated in the first stage to at least the desired activation temperature of the catalytic reaction.

6. A process as claimed in claim 1, wherein the cold reactive gas is substantially entirely reacted in a single vessel.

7. A process as claimed in claim 2, wherein the amount of heat carried along with the cooled gaseous product stream is substantially equal to the amount of heat exothermically produced by the reaction.

8. A process according to claim 4, further comprising adjusting the amount of additionally introduced reactive gas or cooling gas added to effect a desired temperature change to the reactive gas stream as a function of the lowest or highest temperature respectively, of the gas as it exits said first stages.

9. A process as claimed in claim 4, further comprising adjusting the amount of reactive additive or cooling gas by controlling the average temperature in a redirecting chamber wherein the first direction is changed into the second direction.

10. A process as claimed in claim 2, wherein the reaction is a combustion of an effluent stream.

11. A process as claimed in claim 2, wherein the regenerative material is selected from ceramic pieces or ceramic or metal members with longitudinal holes (honeycombs).

12. A process as claimed in claim 2, wherein the temperature elevation produced ranges from about 100 degrees to 5 degrees.

13. A process according to claim 3, further comprising rotating about the axis of the filling chamber said ducts so as to cause the section of the filling chamber which is entered by the reactive gas to be periodically entered by the gaseous product stream.

14. A process according to claim 2, wherein the reactive gas contains nitrogen oxides which can be reduced by reaction with ammonia.

15. A process according to claim 1 wherein the reactive gas contains 0.001 to 10% by volume of reactive compounds.

16. A process according to claim 1 wherein the reactive gas contains 0.1 to 1% by volume of reactive compounds.

17. A process according to claim 13 further comprising adjusting the rotational speed in order to obtain a desired reaction temperature in the zone of catalytic reactions, the higher the speed, the higher the peak temperature in the catalyst.

18. A process according to claim 1 wherein said second part of the first stage is conducted without any cooling of the catalyst.

19. A process according to claim 1, wherein at an adiabatic exotherm of 30 degrees, said stages are rotated at a rate of 2-20 revolutions per hour.

20. A process according to claim 1, wherein at an adiabatic exotherm of 80 degrees, said stages are rotated at a rate of 2-5 revolutions per hour.

21. A process according to claim 1, wherein said stages are rotated at a rate of 2-20 revolutions per hour.

22. A process according to claim 1, wherein said cold reactive gas is a waste gas from a chemical process, a coating process, a printing plant, a tire production plant, a leather tanning plant, a textile cleaning plant, a biological wastewater treatment plant, an animal farming facility, a garbage processing facility, an animal carcass utilization facility, or power plant flue gases.

23. A process according to claim 1, wherein said cold reactive gas is a gas from a chemical process.

* * * * *